United States Patent
Baranowski

[15] 3,675,395
[45] July 11, 1972

[54] APPARATUS FOR THE PURIFICATION OF OILS AND THE LIKE

[72] Inventor: Leslie B. Baranowski, Cookeville, Tenn.

[73] Assignee: Keene Corporation, New York, N.Y.

[22] Filed: Oct. 9, 1970

[21] Appl. No.: 79,542

Related U.S. Application Data

[62] Division of Ser. No. 789,898, Jan. 8, 1969, Pat. No. 3,561,193.

[52] U.S. Cl. ........................................................... 55/164
[51] Int. Cl. .......................................................... B01d 19/00
[58] Field of Search ............................ 55/46, 55, 56, 164, 165

[56] References Cited

UNITED STATES PATENTS

| | | | |
|---|---|---|---|
| 3,249,438 | 5/1966 | Topol | 196/46.1 |
| 3,112,190 | 11/1963 | Topol | 55/46 |
| 3,065,354 | 11/1962 | Bird | 250/218 |
| 2,457,903 | 1/1949 | Kantor et al. | 55/165 |
| 3,193,989 | 7/1965 | Sebeste | 55/164 |
| 2,870,859 | 1/1959 | Topol et al. | 55/20 |
| 2,800,232 | 7/1957 | Marvel | 210/484 |
| 3,561,193 | 2/1971 | Baranowski | 55/46 |

Primary Examiner—Reuben Friedman
Assistant Examiner—R. W. Burks
Attorney—Jeffers and Rickert

[57] ABSTRACT

An apparatus providing for a process for the purification of electrical insulating liquids such as transformer oils, lubricating oils, and hydraulic oils containing water, air, and gases having the steps of transferring the oil to heater for raising the temperature of the oil approximately 40° F. above the inlet temperature, then passing the oil through a filter-separator for removing the free water and solid contaminant, then passing the oil through a vacuum degasifier for removing the remaining impurities such as gases, air, and water vapor, metering the purified oil and returning the oil to the place of intended use.

2 Claims, 2 Drawing Figures

APPARATUS FOR THE PURIFICATION OF OILS AND THE LIKE

RELATED APPLICATION

This is a divisional application of my co-pending application Ser. No. 789,898 filed Jan. 8, 1969 now U.S. Pat. No. 3,561,193 issued Feb. 2, 1971.

BACKGROUND OF THE INVENTION

My invention relates to an improved apparatus for the purification of oils such as transformer oils, lubricating oils, and hydraulic oils which are contaminated with water, air, gases, and solid particles.

In prior purification systems the oil was heated to reduce its viscosity to a suitable value and was sprayed through small nozzles against the walls of the degasifying chamber maintained under vacuum. If one spraying cycle was insufficient to remove the water and gases, the oil was atomized again and the cycle repeated until satisfactory results were obtained. This method of purification is not considered satisfactory for the reason that the breaking up of the oil into small droplets, occluding vapor and gases, increases the surface tension of the bubbles and makes their final disintegration very difficult. The vacuum becomes ineffective and the whole process leads to incomplete purification, and several passes are not completely effectual. Another method in the prior art, the purification was achieved by passing the oil over a large number of thin wall steel rings or saddles filling the column. This method was not considered satisfactory because of the failure to obtain uniform flow over the extended surfaces.

The principal function of transformer oil is to provide electrical insulation and to cool transformer windings by absorbing the heat generated during operation and conducting it to the exterior surfaces. In switch gear and circuit breakers oil also quenches the electric arc. To carry out its functions in the most efficient way, insulating oil must be of good quality and free of contamination. Some electrical and electronic apparatus requires insulating oil of a superior quality in respect to freedom from contamination in order to insure high dielectric strength and a long time service under extreme stresses. Also, cables, extra high voltage transformers, bushings, and capacitors are in this category and require oil better than new.

There are many types of contamination, such as water, solid particles of dust, metals, colloidal carbon, products of corrosion, acids, resins, gums, tar, sludge, organic contaminants and solvents, air and gas which adversely affect the insulating properties of oil.

Contamination enters transformer oil in many ways. Some occurs in various phases of oil transfer from the refinery to the point of use. Some enter through breather vents or in case of seal transformers during the process of filling or overhaul. Some residual moisture and contamination can be found even in new transformers. It is a known fact that water and air are always present in oil in soluble form. Water in its free phase may be present either dispersed in form of emulsion or settled at the bottom of the reservoir. With synthetic oils heavier than water it will tend to collect at the surface or near the top of the transformer, where it is least desired. Contaminants and products of oil deterioration reduce dielectric strength of oil by forming a path of low resistance for electric discharge through the oil. Great care, therefore, must be used to exclude such impurities from oil during shipment, storage, handling, and filling transformers to prevent their build up during service. Synthetic oil, such a silicones and chlorinated aromatic hydrocarbons must be particularly maintained in dry condition due to their affinity to water. Protection of electrical apparatus by continuous or frequent purification of insulating oils will eliminate costly breakdowns and assure a safe and dependable operation. Preventive maintenance costs are usually less than reclamation of oil and in addition helps to keep the equipment at its best efficiency.

Accordingly, an object of my invention is to provide an improved apparatus for the purification of transformer oils and the like.

Another object of my invention is to provide a new and improved apparatus for degasification and vacuum dehydration of electrical insulating oils and hydraulic fluids which apparatus employs all of the best factors favorable in reaching minimum soluble water and gas content in a single pass of the oil through the system.

A still further object of my invention is to provide a new and novel degasifier utilizing fiber glass cartridges wherein a very large surface of the oil is exposed to vacuum due to the presence of millions of sharp ends of the glass fibers of 3 to 8 micron diameter which contributes to the evolution of the gas from oil and to the break up of forming gas bubbles.

Another object of my invention is to provide a new and novel degasifier having controls for maintaining a predetermined level within the degasifier and further provided with safety controls to stop the operation of the degasifier in the event some malfunction in the oil control system occurs.

SUMMARY OF THE INVENTION

Briefly, these and other objects are achieved in accordance with my invention by a process wherein the oil is heated to approximately a temperature range of 40° to 200° F. and thereafter passed through a filter-separator for the removal of free water and solid contaminants. The oil is then passed through a degasifier which is under vacuum for the removal of the remaining impurities contained within the oil. A number of controls are employed in the system to provide the proper level of oil in the degasifier and to provide safety features in the event some malfunction occurs in the oil control system which may cause flooding or faulty operation of the degasifier.

BRIEF DESCRIPTION OF THE DRAWINGS

The structure and operation of my invention, together with further objects and advantages, may be better understood from the following description given in connection with the accompanying drawings, in which.

DESCRIPTION OF THE PREFERRED EMBODIMENT

Figure 1:
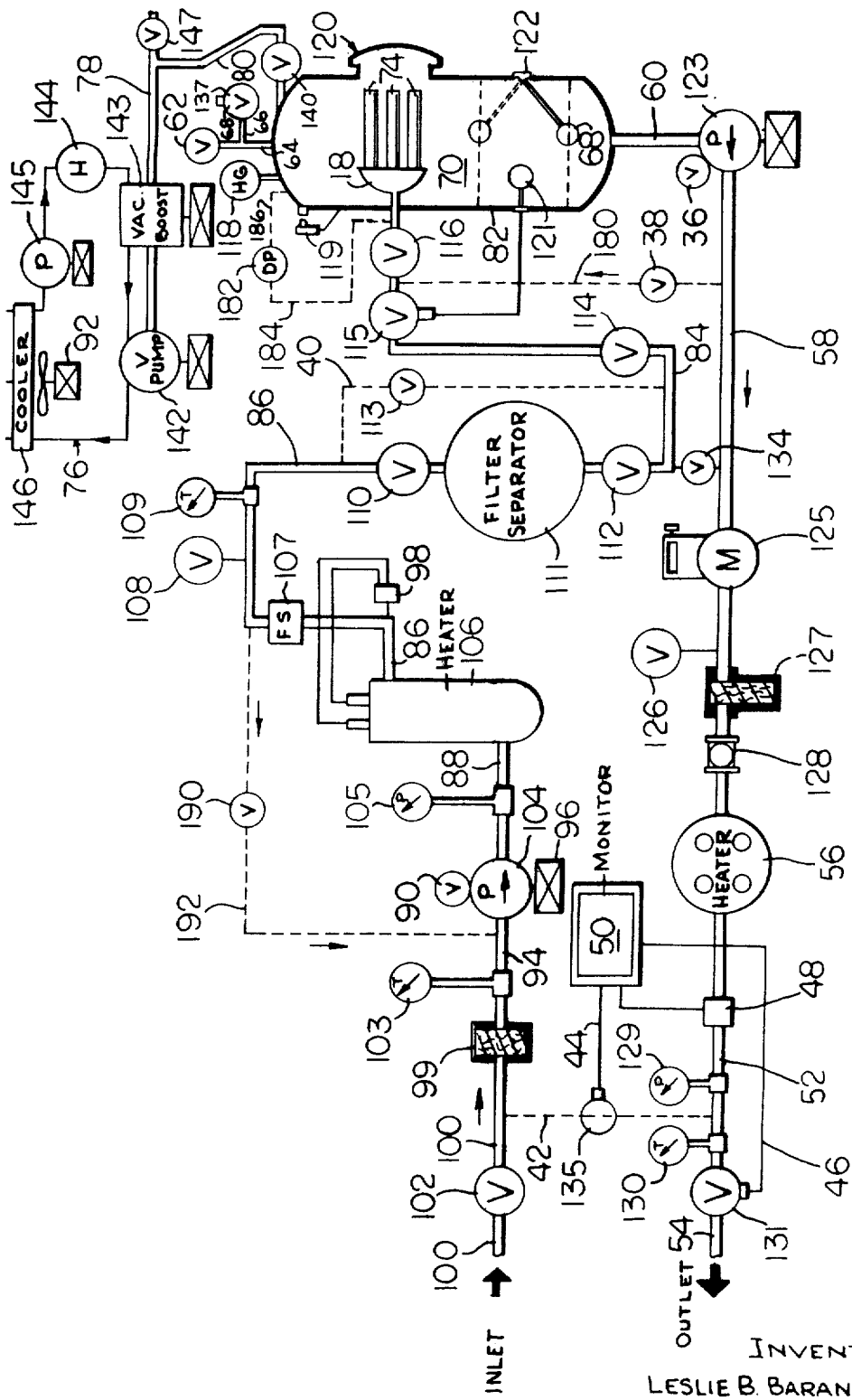
FIG. 1 shows a flow diagram illustrative of the purification process in accordance with my invention.

With respect to the flow diagram illustrated in FIG. 1, I have shown an inlet line 100 having an inlet valve 102 for supplying oil to the purification system. The oil passes through a conventional strainer 99 which removes solid contaminants that are fairly large in size. An inlet pump 104 driven by a motor 96 is connected to the strainer through a line 94. The inlet pump 104 is provided with an internal bypass relief valve 90 which is set at approximately 50 psi. A temperature indicator 103 is disposed in the line 94 for indicating the inlet oil temperature.

A heater 106 which comprises one or several 16 kw low density heaters connected in series, is connected to the inlet pump 104 through line 88. A pressure indicator 105 is disposed in the line 88 for indicating the inlet pump 104 discharge pressure. The heater 106 is controlled by thermostats 98 and a flow switch 107, which is disposed in the heater discharge line 86. The thermostats 98 are adjustable and are preferably set so that the heater raises the oil temperature above the oil inlet temperature to the desired process temperature. The flow switch 107 is a safety device which is connected to the heater to prevent the heater from operating under no flow conditions. When the oil flows through line 86, the flow switch is closed permitting the heaters to be energized, and under no flow conditions the flow switch is open thus preventing the heaters from being energized.

A filter-separator 111 constructed substantially in accordance with U.S. Pat. Nos. 2,800,232 and R. 24,136, serves to coalesce and remove substantially all of the free water contained in the oil. The filter-separator further serves to remove the fine contaminant which is not removed by the strainer 99. A sample valve 108 is connected in the line 86 and is adapted to be manually operated to remove samples of the oil from the line before it reaches the filter-separator. A temperature indicator 109 is disposed in line 86 for indicating the output temperature of the oil from the heater 106. The filter-separator 111 is connected to the degasifier 120 through line 84. The degasifier 120 is in the form of a tank 82 having a vacuum pump 142 connected thereto through line 80. A vacuum booster 143 is disposed in the line 80 for increasing the vacuum and gas flow rate when desired. A hand operated butterfly type valve 140 is disposed in the line 80 for adjusting the amount of vacuum pulled on the tank 82. Provision is made for applying an auxiliary vacuum through line 78 and valve 147. The auxiliary vacuum line can be used if desired, for connection to a transformer for pulling a vacuum thereon and drying out the insulation by removing moisture.

The vacuum pump 142 and high vacuum booster 143 is provided with a cooling system 76 having a cooler 146, a pump 145, and a heater 144. The vacuum cooling system 76 is adapted to maintain a temperature range of approximately 100° to 130° F. Therefore, when the temperature of the coolant falls below 100° F., the heater 144 is energized, and the cooling fan 92 on radiator is deenergized. Conversely, when the temperature of the coolant rises above 130° F., the heater 144 is deenergized and the cooler fan 92 is energized. The cooling system is controlled by an adjustable thermostat not shown. A vacuum gauge 118 is connected to the upper portion of the tank 82 to indicate the degree of vacuum being pulled.

As the oil enters the tank 82 it passes through a number of fiber glass cartridges which provides a very large surface of oil exposure to vacuum, and the presence of millions of sharp ends of the glass fibers of 3 to 8 microns in diameter contributes to the evolution of the separation of the air and gases from the oil as it becomes exposed to the vacuum inside the degasifier chamber. The fiber glass cartridges may be constructed substantially as illustrated in U.S. Pat. No. 2,800,232.

The degasifier 120 is provided with three sets of automatic controls which will now be described. A control valve 115 is disposed in the line 84 and is operated by a float 121 to maintain the working oil level in the degasifier chamber 70. As the oil raises in the chamber 70, the float 121 will throttle the valve 115 until the operating oil level is restored. When the oil in the chamber 70 is lowered, the float 121 will open the valve 115 wider, thus maintaining a working level of oil in the chamber 70. An oil level switch 122 is provided as a safety device so that a maximum and minimum safe oil level in the chamber 70 is not exceeded. When the float 68 reaches the lower position as shown in FIG. 1, the low level switch is closed wherein the following events take place: A low level red light (not shown) is energized, indicating that the minimum oil level has been reached in the degasifier chamber. The discharge pump 123 is deenergized until the oil level has been raised back to the normal operating level, at which time the low level red light is deenergized and the discharge pump 123 is restored to operation. If for some reason or other the oil level raises beyond the normal operating level so that the float 68 is in the upper position as shown in broken lines in FIG. 1, the high level switch is energized and a red high level light (not shown) is energized, and the inlet pump 104 runs for a preset time and then is deenergized. At the same time the heaters 106 are deenergized. When the oil level is reduced to the normal operating level, the red high level light is deenergized and the inlet pump 104 and the heaters 106 are again energized to return the purification system to normal. In the event there is some malfunction in the level control system, and flooding or foaming occurs the photoelectric eye module 119, which is mounted in the upper portion of the degasifier chamber 70, has its light interrupted and the inlet pump 104 is deenergized immediately. Simultaneously with the deenergization of the inlet pump 104, the vacuum break solenoid 137 is energized thus opening the valve 68 thereby breaking the vacuum to lines 66 and 64. At the same time the red high foam level light (not shown) is energized, and an electric alarm (not shown) sounds, indicating the flooding condition. When the flooding or foaming is reduced and the light path to the photocell 119 is again uninterrupted the purification system will return to its normal operating condition. A manual valve 62 is provided in the vacuum line 64 to break the vacuum in the chamber 70 when desired. A valve 116, which is manually controlled, is disposed in the line 84 between the valve 115 and the degasifier 120 for adjusting the oil flow rate. The discharge pump 123 is connected to the degasifier 120 through line 60. The discharge pump 123 is connected to an optional heater 56 through line 58, flow meter 125, a final filter 127, and flow sight 128. The heater 56 is adjusted to raise the temperature of the oil to approximately 100° C. for the transformers which require the oil to be heated to this temperature. If such a requirement is not required, the heater 56 may be omitted. From the heater the oil flows to the outlet 54 through line 52 which is controlled by a discharge valve 131. A monitor 50 has a sensing head 48 disposed in the outlet line 52 for determining the purification of the oil, and in the event moisture or other contaminant is present the monitor closes the discharge valve 131 through electrical line 46 and opens the bypass valve 135 through electrical line 44 so that the oil will return to the purification system through the bypass line 42. A pressure indicator 129 is disposed in line 52 for indicating the filter discharge pressure and the temperature indicator 131 located in line 52 shows the oil discharge temperature. A sample valve 126 is connected in line 58 between the final filter 127 and the flow meter 125 for withdrawing samples of the oil from the degasifier 120.

A bypass system is provided for the filter-separator 111 by the valves 110, 112, 114, 113 and 134. For example, if there is very little water or moisture in the oil, the valves 110 and 112 may be closed and valve 113 opened so that the flow of oil will flow through line 86 and bypass line 40, directly to the degasifier 120. Under some operating conditions it may be feasible to bypass the degasifier in which event the valve 114 is closed and the valves 110, 112 and 134 are opened so that the oil flows from the filter-separator directly to the discharge line 54. The discharge pump 123 is provided with an internal pressure relief valve 36, and an external relief valve 38, for recirculation of oil through line 180 through the degasifier 120. The degasifier chamber 70 is equipped with a differential pressure gauge 182 connected to the inlet side 184 and to the outlet side 186 for indicating the dirt loading of the fiber glass cartridges 74.

Figure 2:
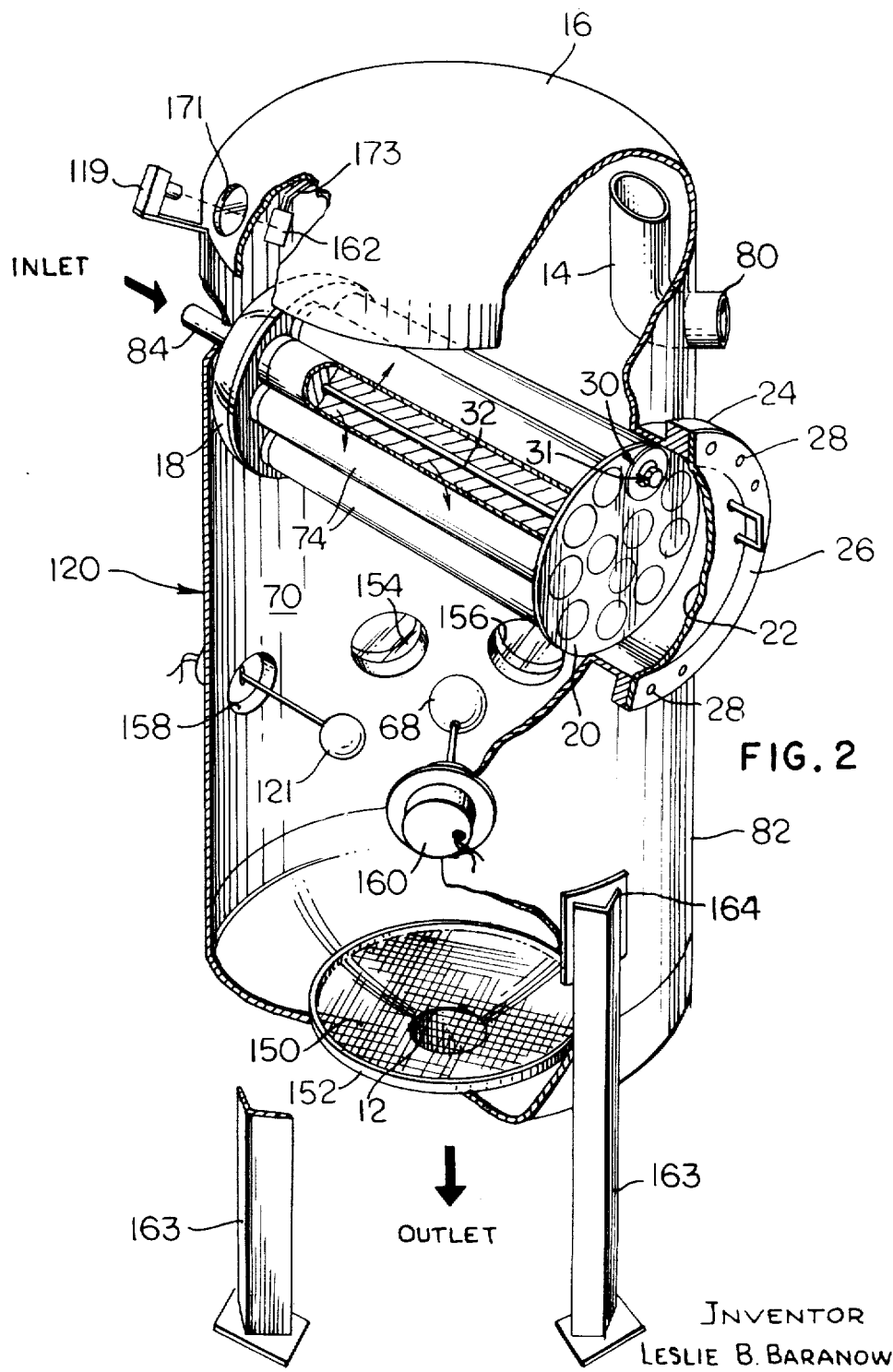
FIG. 2 shows a perspective view with parts broken away of the degasifier made in accordance with my invention.

Referring now to FIG. 2 wherein the degasifier 120 will be described in more detail, the reference numeral 82 designates a tank having an oil inlet 84, and an oil outlet 12. The vacuum line 80 is disposed in the upper portion of the tank having a portion 14 extending upwardly toward the cover 16. A header 18 is mounted within the tank 82 and is adapted to support horizontally a number of fiber glass filter elements 74 within the tank. The header 18 is provided with a number of conventional stand pipes 32 with openings for communication with the inside surface of the fiber glass cartridges 74. The tank 82 is provided with an opening 22, with a flange 24 disposed therearound for receiving a cover 26 which is secured thereto by bolts 28. A support plate 20 is disposed adjacent the opening 22 and is secured thereto by means of a bracket not shown. Each fiber glass cartridge is secured to the header 18 and to the support plate 20 by end plate 30 and bolt 31.

A circular screen member 150 having a flange 152 is mounted over the oil outlet 12. A pair of glass-enclosed windows 154 and 156 is disposed in the side of the tank to permit observation of the degasification of the oil and operation of the float controls within the vacuum chamber 70. The float 121 for controlling the operating level of the oil is mounted in opening 158, and the float 68 for controlling the high and low level safety switches 122 is mounted in the opening 160. The photoelectric eye module 119 having a light and photocell passes a beam of light through opening 171 to a reflecting mirror 162 mounted by a bracket 173 inside of the chamber 70 near the upper portion of the tank 82. The module 119 and mirror 162 is mounted at an angle of approximately 5° to 15° from the horizontal plate. The legs 163 are welded to the tank at 164 for maintaining the tank 10 in a vertical position.

To place the purification system in operation, the inlet valve 102, valve 110, valve 112, 114, valve 116, valve 140 and discharge valve 131 are opened, and the bypass valves 113, 134, 135 are closed. The vacuum pump 142 is energized and as the vacuum in the vacuum chamber reaches suitable level, the booster 143 is energized to provide higher vacuum in the chamber 70. The inlet pump 104 is now energized, transferring the oil at the rate of approximately 125 to 150 percent of the normal flow rate from the inlet 100 through a strainer 99 for removing large portions of solid contaminant and then through lines 94 and 88 to a heater 106 which raises the oil temperature to the required process temperature. The thermostats 98 may be adjusted to vary the temperature of the oil if so desired. The excess oil flow from the heater 106 recirculates through line 192 having a relief valve 190, back to the suction side of the inlet pump 104. The balance of oil flows from the heater 106 through line 86 to the filter-separator 111 wherein the oil passes through fiber glass coalescer elements which coalesces the water into droplets, and the free water is separated from the oil. In addition, the coalescer element removes substantially all of the solid contaminants contained in the oil. The oil flows from the filter-separator 111 through line 84 to the degasifier 120. As the oil enters the degasifier, it flows into a header 18 which distributes it to a number of fiber glass elements 74 which provides a very large surface of oil exposure to vacuum so that a very thin film of oil is exposed to the vacuum chamber 70. It has been found that the fiber glass elements containing millions of sharp ends of glass fibers contribute substantially to the evolution of the air and gas separation from the oil and further serves to break up the surface of the forming gas bubbles, thus releasing the gas. The air, gases and other volatiles are removed through the vacuum line 80. The purified oil is removed from the degasifier by the discharge pump 123 through line 60 and discharged to the line 58 to a flow meter 125 which registers the amount of oil passing through the line. The oil flows from the flow meter 125 to a conventional final filter 127 and then to a heater 56 which raises the ambient temperature in the range of 80° to 100° C. depending upon the required oil temperature for filling a transformer. The high oil temperature reduces viscosity of oil and gives it a better penetration characteristic. The oil flows from the heater 56 to the outlet 54 through a sensing head 48 which indicates the dryness and condition of the oil after it is passed through the purification system. It has been found that the transformer oil purified by this system can be dehydrated to less than 10 ppm of soluble water content and less than 0.25 percent soluble gas content, prior to its entry into the transformer in a single pass through the purifier.

It will thus be seen that my invention provides an improved process for the purification of oils, such as transformer oils, lubricating oils, and hydraulic oils which are contaminated with water, air, gases and solid particles. Although I have shown only one block diagram illustrating the process of my invention, persons skilled in the art will appreciate that modifications may be made. Therefore, while my invention has been described with reference to a particular flow diagram, it is to be understood that modifications may be made without departing from the spirit of the invention.

What I claim as new and desire to secure by Letters Patent of the United States is:

1. A degasifier apparatus for removing moisture and gases from oils and the like comprising, in combination:
    a. a tank having an oil inlet disposed in the upper portion of the tank and an oil outlet disposed in the lower portion of the tank,
    b. vacuum producing means connected to the upper portion of the tank,
    c. first pump means including a control valve for supplying oil to the inlet,
    d. second pump means connected to the oil outlet for removing the oil from said tank,
    e. a header mounted on the side wall of said tank and connected to said oil inlet,
    f. support means mounted on the side wall of said tank substantially opposite said header,
    g. a number of fibrous cartridges carried by said header and support means, said cartridges having a large surface of fibers to permit the oil to have substantial exposure to the vacuum within said tank,
    h. oil control means disposed within the tank for actuating the said control valve to open said control valve wider when the oil level is lowered and to throttle said control valve as the oil raises within said tank,
    i. and oil level control means disposed within said tank for maintaining a predetermined maximum and minimum safe operating level in said tank, said oil level control means adapted to deenergize said second pump when the minimum oil level is reached and to reenergize said second pump when the normal operating level of oil is obtained, said oil level control means adapted to deenergize said first pump when the oil level raises beyond the normal operating level and to reenergize said first pump when the oil level is reduced to the normal operating level.

2. The apparatus of claim 1 including a photoelectric eye module mounted in the upper portion of said tank, said photoelectric eye module adapted to deenergize said first pump and break the vacuum to said tank when flooding or foaming occurs within said tank.

* * * * *